INVENTOR.
LLOYD ROBERT SCHISSLER

Feb. 27, 1968  L. R. SCHISSLER  3,371,346
PULSE SEGMENT IDENTIFIER
Filed Aug. 31, 1966  3 Sheets-Sheet 2

INVENTOR.
LLOYD ROBERT SCHISSLER
BY
Weingarten, Orenbuch & Lahive
ATTORNEYS

INVENTOR.
LLOYD ROBERT SCHISSLER

United States Patent Office 3,371,346
Patented Feb. 27, 1968

3,371,346
PULSE SEGMENT IDENTIFIER
Lloyd Robert Schissler, Boston, Mass., assignor to Aerospace Research, Inc., Boston, Mass., a corporation of Massachusetts
Filed Aug. 31, 1966, Ser. No. 576,472
3 Claims. (Cl. 343—103)

ABSTRACT OF THE DISCLOSURE

Apparatus for identifying a segment of a recurring pulse. A selected segment of the pulse is identified by sequentially sampling the incoming signal, weighting each sample in accordance with its position in the sequence, and integrating the weighted samples.

This invention relates in general to apparatus for accurately locating a segment of a periodically recurring pulse. More particularly, the invention concerns a Loran receiver having apparatus for sampling the incoming signal to ascertain the location of a segment of a periodically recurring pulse.

In recent years it has been proposed to employ Loran-C, a navigation system, for precise time dissemination. An exposition of this employment of Loran-C is set forth in a monograph titled "Timing Potentials of Loran-C" in the Proceedings of the Institute of Radio Engineers, vol. 49, November 1961, pp. 1659–1673. Emission times of the Loran-C pulses radiated from some Loran-C stations are now closely synchronized with the master clock of the U.S. Naval Observatory.

Basically, a Loran-C system consists of a master station and at least two slave stations. Loran-C stations transmit a train of regularly spaced pulses in a single burst. Each station, for example, transmits a basic group of eight pulses in a burst and the master station includes a ninth pulse in its burst to permit the master station to be readily distinguished. The burst of pulses from each slave station is emitted a fixed interval after a pulse burst is emitted by the master station and that interval is different for the two slave stations to permit those stations to be easily distinguished. The time difference between reception at the same location of a master pulse and a corresponding slave pulse determines a hyperbolic line of position and the intersection of two such hyperbolic lines gives the position of the receiver.

The Loran-C system was established in an effort to extend Loran groundwave coverage to more distant areas. Loran-C is a low frequency system using a 100 kHz. carrier frequency and having a channel allocation of 90 to 110 kHz. The duration of a Loran-C pulse is approximately 300 microseconds and because of bandwidth limitations, the rise time of the pulse is not less than 50 microseconds. In contrast, the standard Loran-A system operates at frequencies near 2 MHz. and transmits a pulse of approximately 40 microseconds duration which has a rise time of 15 microseconds. The steeply rising pulse of the standard system permits the matching of pulse envelopes to be employed as the basis for the measurement of the time difference between the reception of the master and slave signals. Because the Loran-C pulse lacks a steep rise, poor accuracy is obtained when the technique of envelope matching is employed. To obtain more accurate results, a technique of "cycle matching" has been employed in which a "coarse" match is obtained by utilizing the pulse envelopes and a "fine" match is obtained by aligning the R.F. cycles of the received signals on an oscilloscope screen. Cycle matching has improved the accuracy of time difference measurements because a zero axis crossing of an R.F. cycle can more easily be determined than a point on the envelope of the Loran-C pulse. However, cycle matching tends to yield ambiguous results as corresponding axis crossings of corresponding cycles must be matched if whole cycle errors are to be avoided. That is, inaccurate results are obtained, for example, where the zero axis crossing of the third cycle in the master pulse is compared with the zero axis crossing of the fourth cycle in the slave pulse. For accurate results, the comparison must be made with the corresponding cycle, viz. the third cycle, in the slave pulse.

In the employment of Loran-C emissions to obtain precise time information, a known point on the received pulse, such as the beginning of the pulse, must be established. Merely establishing a point, such as the zero crossing of the pulse's R.F. carrier, is not sufficient unless the cycle at which the zero crossing occurs can also be identified.

The objective of this invention is to provide apparatus for unambiguously determining a point on a recurring pulse. To achieve that objective a selected segment of the pulse, whose characteristics are known, is identified by sequentially sampling the incoming signal. Each sample is weighted in accordance with its position in the sequence and the weighted samples are applied to an integrator. The weights assigned to the samples are such that the output of the integrator is a unique and known value only when the sampling sequence is performed upon the selected pulse segment. The sampling operation is shifted in time relative to the received signals to obtain that unique and known value.

The invention, both as to its construction and its mode of operation, can be more fully understood from the following exposition when considered in conjunction with the accompanying drawings in which.

Referring now to FIG. 1A, there is shown a sequence of transmissions that is typical of the Loran-C system. Each station radiates a basic group of eight pulses and the master station transmits a ninth pulse for identification. The pulses of a group are transmitted in a burst having the pulses regularly spaced in a train at 1 millisecond intervals with the exception of the master's identification pulse which is the last pulse in the group and follows the eighth pulse by a different interval. The burst from the master station is designated MB in FIG. 1A whereas the successive bursts from the two slave stations are respectively designated SB–1 and SB–2. The SB–1 burst from the first slave station always precedes burst SB–2 from the other slave station in the area intended to be served by the Loran-C chain. The burst of pulses is repetitively transmitted with a period such that at least ten bursts are emitted by each station each second.

FIG. 1B depicts a typical pulse emitted by a Loran-C station. The rise time of the envelope of the pulse is precisely defined and is carefully held to the definition by the transmitter. The 100 kHz. carrier oscillations, shown within the envelope, are maintained coherent from pulse to pulse and from burst to burst at the Loran-C transmitter.

FIG. 1C is an enlargement of the first three R.F. cycles of the FIG. 1B pulse. Each succeeding half cycle has a greater amplitude than its preceding half cycle in accordance with the precisely defined rise time of the pulse. The pulse segment containing the first three R.F. cycles of the pulse is of special interest where it is intended to utilize the ground wave portion of the Loran-C signal. At ranges where the ground wave is severely attenuated, the sky wave portion of the Loran-C signal can be employed and some other segment of the pulse is then of primary interest.

Figures 1, 2:
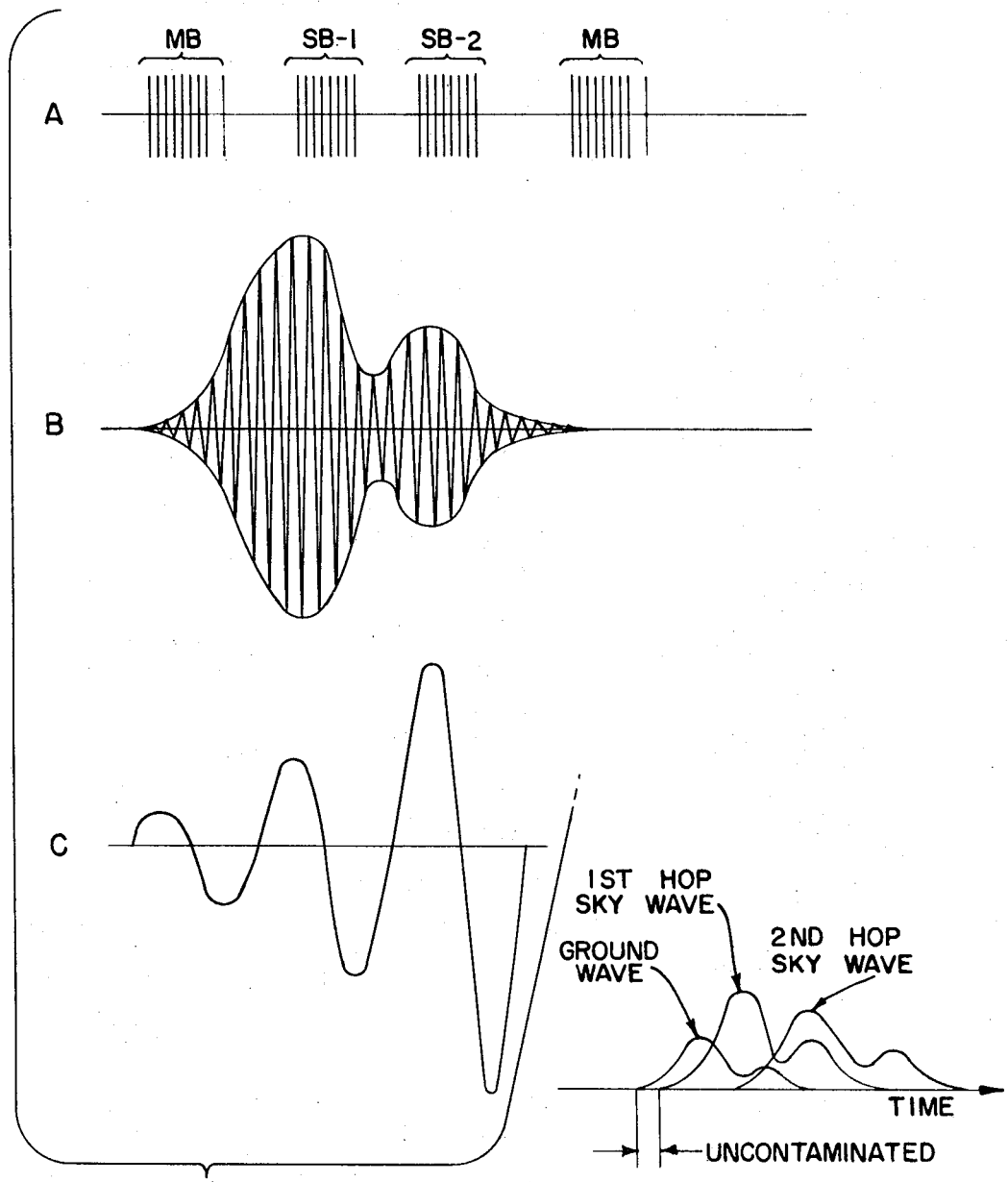
FIG. 1 depicts typical Loran-C signals.
FIG. 2 shows the time relationship, at the receiver, between ground wave and sky wave signals.

As is known, electromagnetic radiations may be reflected from the ionosphere and those reflections are termed sky waves. Loran-C emissions which propagate by ground wave are more stable than the sky waves because sky wave propagation is dependent upon ionospheric characteristics which exhibit diurnal and other variations. As the range between the Loran-C transmitter and the receiver increases, the first hop sky wave arrives progressively closer in time to the ground wave and the sky wave becomes larger in amplitude than the amplitude of the received ground wave. For precise measurement, it is desired to use only that part of the ground wave that is not contaminated by the sky wave signal. FIG. 2 is a typical example of the waveforms of the signals arriving at a Loran-C receiver and of their relationship in time when the receiver is far distant from the transmitter. At a range of 1500 km. over land or 3000 km. over the ocean, only a small segment of the ground wave is uncontaminated by the first hop sky wave and that segment is, approximately, the first 30 microseconds of the ground wave pulse. In many cases, multihop sky waves may arrive at the Loran-C receiver so as to coincide with the ground wave of the next pulse in the group. To minimize this type of contamination and to reduce the effect of coherent noise, the Loran-C system employs phase coding of alternate pulses and groups, and Loran-C receivers employ phase decoders to decode the received signals.

Figure 3:
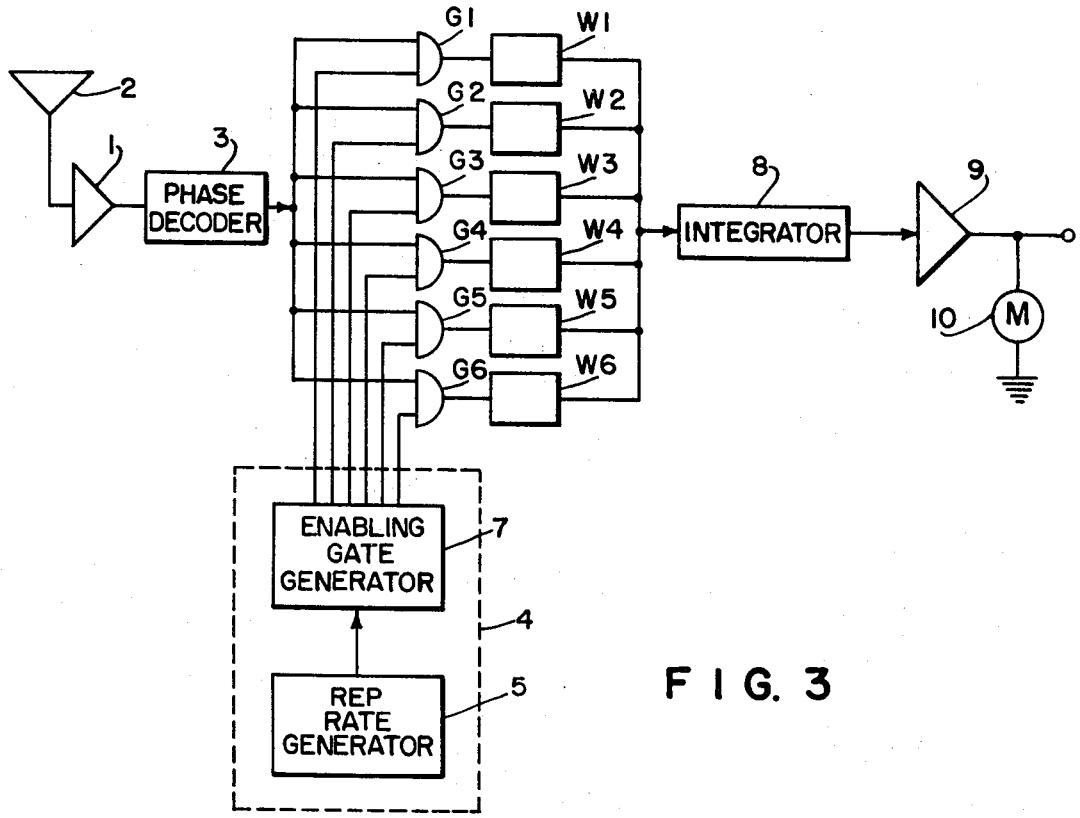
FIG. 3 shows the scheme of the preferred embodiment of the invention.
Figure 4:
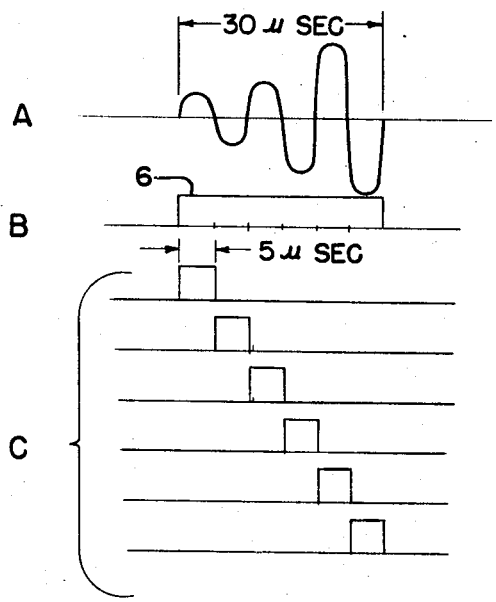
FIG. 4 depicts signals occurring in the operation of the invention.

The scheme of the preferred embodiment of the invention is depicted in FIG. 3. In the exposition of this embodiment, it is assumed that the uncontaminated portion of the ground wave signal is to be employed and that the location of the first 30 $\mu$sec. segment of the pulse is to be determined. In the FIG. 3 embodiment, amplifier 1 enhances the Loran-C signals incident upon antenna 2 and the output of the amplifier is impressed upon a phase decoder 3. The antenna, amplifier, and phase decoder may be the usual components employed in a conventional Loran-C receiver. The output of the phase decoder is coupled to an array of gates G1, G2, G3, G4, G5 and G6, which are controlled by a timing source 4 to open the gates, one at a time, in sequence. The timing source employs a generator 5 that emits a gate signal 6 (FIG. 4B) whose duration determines a period in which the output of the phase decoder is sequentially sampled. For the purpose of this exposition, it is assumed that the duration of gate 6 is 30 $\mu$secs. and therefore is equal to three times the period of the carrier frequency of the Loran-C pulse so that three consecutive cycles of a Loran-C pulse can occur during the time that gate signal 6 persists, as indicated in FIGS. 4A and 4B. Gate signal 6 is repetitively generated and recurs at same rate as the Loran-C emissions of a selected Loran-C transmitter. That is, if the transmitter chosen is the slave station which emits a burst of eight pulses at regular intervals, then generator 5 regularly emits eight gating signals at equal intervals. As the rate at which generator 5 repetitively emits a gate signal is the same as the rate of pulse emissions of the selected Loran-C transmitter, generator 5 is herein termed the repetition rate generator and gate signal 6, which determines the interval over which the incoming signal is sampled, is termed the repetition rate gate. The repetition rate generator controls generator 7 (FIG. 3) which supplies consecutive enabling signals to gates G1, G2 . . . G6. Each enabling signal permits the gate to which it is fed to be enabled for a time not exceeding a half cycle of the carrier frequency. In this exposition, it is assumed that the gate is enabled for the entire half cycle. In the case of Loran-C which employs a carrier frequency of 100 kHz., the period of a half cycle is 5 microseconds. Having selected the first 30 $\mu$sec. portion of the pulse as the segment to be identified, the repetition rate gate 6 is 30 $\mu$secs. in duration to permit six consecutive 5 $\mu$sec. enabling signals, as shown in FIG. 4C, to be emitted by generator 7 to enable gates G1 through G6 in sequence.

Where repetition rate gate 6 is contemporaneous with the reception of the first three R.F. cycles in the Loran-C pulse, the sequential enabling of gates G1 through G6 by the signals from generator 7 causes each gate to pass a different half cycle of the R.F. carrier. The signal passing through each gate proceeds to a weighting device W1, W2 . . . or W6 (FIG. 3) which alters the gated signal in accordance with a mathematical function. The weighted signal then is impressed upon an integrator 8. The output of integrator 8 is applied to an amplifier 9 whose output is coupled to a meter 10.

The Loran-C pulse envelope, expressed mathematically is a function of the form $$f(t) = \left(\frac{t}{72.5 \times 10^{-6}}\right)^2 e^{-2\left(\frac{t}{72.5 \times 10^{-6}} - 1\right)}$$

As previously stated, the segment of the Loran-C signal that is here of interest is the first 30 mircoseconds (3 cycles) of the pulse. That 30 microsecond segment of the pulse normally arrives at the receiver before any sky wave component and, consequently, exhibits ground wave stability. It is known that the ground wave is free of diurnal or other variations to less than 0.1 microsecond even at the extreme range of the receiver. By employing the first 30 $\mu$secs. of the pulse, all the available uncontaminated ground wave information is utilized. The six half-cycles (FIG. 1C) in the first 30 $\mu$secs. have amplitudes $x_1$ through $x_6$ which are related by the precisely defined rise time of the pulse. Weighting functions $A_1$ through $A_6$ are selected so that a determination function F is zero. The determination function F is defined as the dot product of 2 six dimensional vectors as follows:

$$F = \Sigma A_i \cdot X_i = \vec{A} \cdot \vec{X}$$

That is, the weighting functions $A_1$ through $A_6$ are selected on the basis, that (a)

$$F = 0$$

when the repetition rate gate is properly positioned on the first three cycles of the Loran-C pulse and (b) the determination function is non-zero and large for other positions of the gate. Preferably, the sign of F is positive when the gate is on one side of the correct position and is negative when the gate is on the other side of its correct position.

The output of integrator 8 corresponds to the determination function F. The integrator, therefore, provides a zero output when the repetition rate gate is correctly positioned to be contemporaneous with the first three cycles of the received Loran-C pulse. When the repetition rate gate is somewhat in advance of the first 30 $\mu$sec. pulse segment, the integrator may, for example, provide a positive output signal whereas when that gate lags the pulse segment, the integrator provides a negative output signal. The polarity of the integrator's output, thus, indicates the direction of the error in the position of the repetition rate gate relative to the 30 $\mu$sec. segment of the received pulse. Meter 10 is preferably of the type whose pointer is centered on the dial to indicate zero signal and whose pointer swings to one side or the other in accordance with the electrical polarity of the applied signal. The extent of the pointer's deflection then indicates the magnitude of the signal from the integrator. In an elementary form, the meter may simply be a galvanometer.

Repetition rate generator 5 is a device which permits the occurrence of the generated gate to be shifted in time. The shifting of the gate, sometimes referred to as "slewing" of the generator, allows the repetition rate gate to be aligned with the desired segment, viz., the first three R.F cycles, of the received Loran-C pulse. The direction in which the generator is slewed to obtain correct alignment is indicated by the direction of the deflection of the meter's pointer. When the meter indicates zero signal from the integrator, the position of repetition rate gate 6 is such that its leading edge is contemporaneous with the beginning of the first cycle in the received Loran-C pulse. A definite point of the pulse is thus identified.

The weighting device can be a resistor which attenuates the signal in accordance with the desired weighting function or the weighting device can be an active mechanism such as an amplifier, whose gain provides the desired weighting function.

Figure 5:
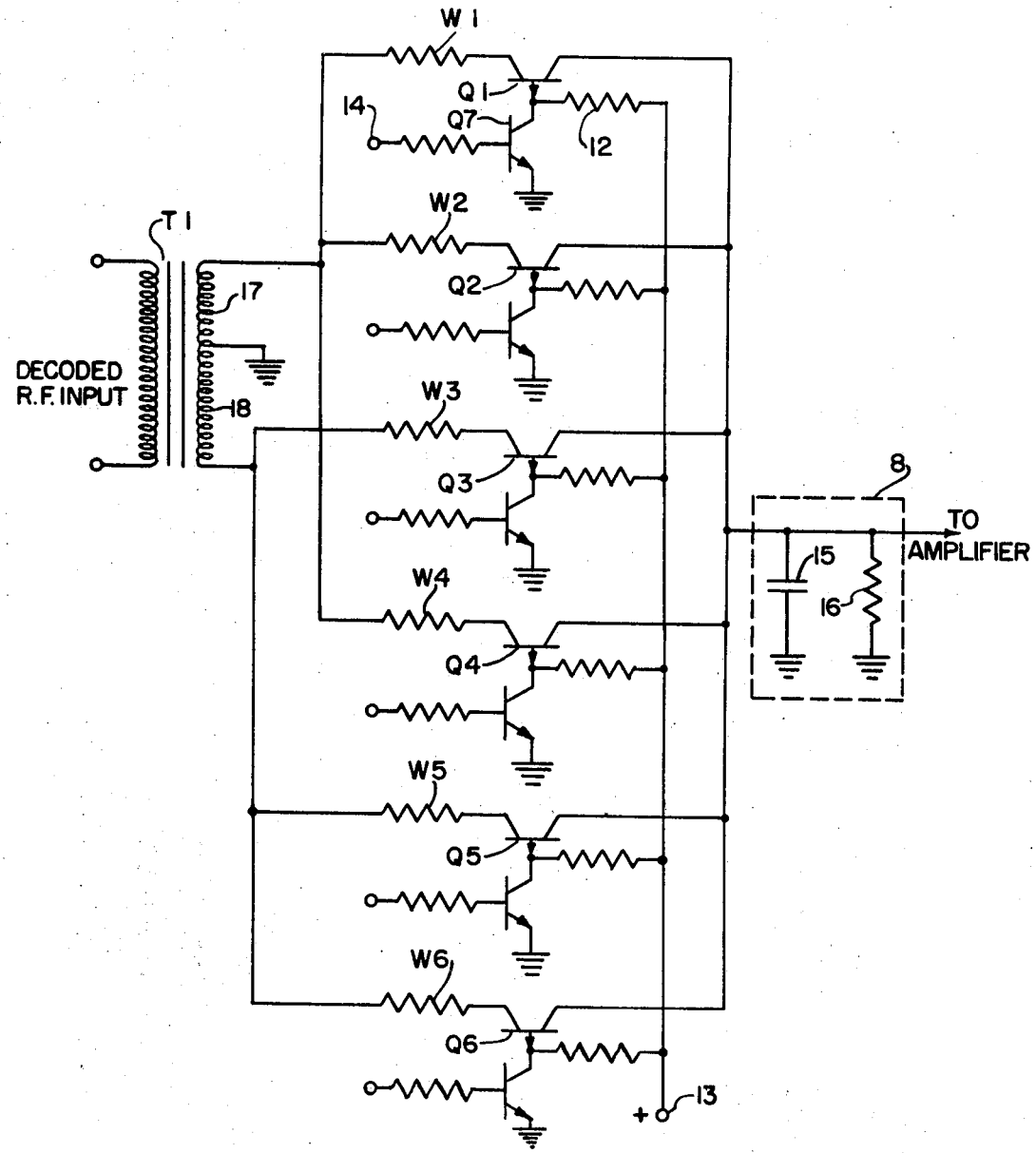
FIG. 5 illustrates an arrangement of gates for performing a sampling sequence.

FIG. 5 shows an arrangement in which the weighting devices W1, W2, ... W6 are resistors. Gates G1, G2 ... G6 employ transistors Q1, Q2 ... Q6 whose outputs are tied to the integrator 8 having a storage capacitor 15 and a resistor 16. As the gates are identical in construction, only the first gate is here described in detail. Transistor Q1 is a device of the type characterized by a high input impedance such as a field effect transistor. The gate electrode of transistor Q1 is connected to the collector of a driver transistor Q7. The emitter of transistor Q7 is grounded and its collector is coupled by resistor 12 to a source of potential at terminal 13. When an enabling pulse is applied at terminal 14 to the base of transistor Q7, that transistor is biased into conduction. The drop in voltage which ensues at the gate of transistor Q1, causes the bias on that gate to make the source to drain impedance of transistor Q1 very low. Consequently, the signal appearing across the upper half of the transformer's secondary is applied through weighting resistor W1 to the integrator. The storage capacitor 15 of the integrator is effectively placed in series with resistor W1 during the time the enabling signal is applied at terminal 14. The amount of current flowing to or from storage capacitor 15 is dependent upon the ohmic value of resistor W1 during that interval. Upon decay of the enabling signal at terminal 14, driver transistor Q7 becomes nonconductive and transistor Q1 thereupon becomes a high impedance. Because the enabling signals (FIG. 4C) are applied to the gates in sequence, each weighting device, in its consecutive order, controls the current flow to or from storage capacitor 15 for a time equal to one half of the period of the R.F. carrier, viz., for a half cycle of the carrier wave. Where the repetition rate gate 6 (FIG. 4B) is aligned with the first three R.F. cycles of the carrier (FIG. 4A), the weighting of the currents is such that the output of the integrator becomes zero.

In FIG. 5, weighting devices W1, W2 and W4 derive their input signals from the upper half 17 of the secondary of transformer T1 whereas the lower half 18 of the secondary supplies the input signals to weighting devices W3, W5, and W6. Because of that arrangement, when repetition rate gate 6 is aligned with the first 30 sec. segment of the pulse (as in FIG. 4), the amount of current supplied to storage capacitor 15 through gates G1 and G6 is equal and opposite to the current supplied to storage capacitor 15 through gates G2, G3, G4 and G5 over the period of integration.

The preferred embodiment of the invention has been described as utilizing the entire uncontaminated ground wave signal available at far distant receivers. In practice, the first half cycle of the uncontaminated signal is of such low amplitude in the remote areas that its effect upon the integrator is negligible and the apparatus can, without material loss in accuracy, be arranged to use only the five remaining half cycles.

The invention can be employed in locations where the ground wave signal is inappreciable by using the sky wave signal. Where the sky wave is of primary interest, the determination function F is then not made zero, but rather is chosen to be the maximum value and the selected segment of the pulse that is sought to be identified is that portion containing the R.F. cycles of greatest amplitude. The weighting functions $A_1, A_2 \ldots A_n$ then are selected on the basis that $$F = \Sigma A_i \cdot X_i = \text{maximum}$$

when the repetition rate gate is aligned with the selected pulse segment and that for other positions of the repetition rate gate the determination function is appreciably less than the maximum.

In view of the multitude of ways in which the invention can be embodied, it is not intended that the scope of the invention be restricted to the precise arrangements illustrated in the drawings or described in the exposition. Rather, it is intended that the scope of the invention be delimited by the appended claims and that within that scope be included only those structures which in essence ultilize the invention.

What is claimed is:

1. In a receiver for receiving a repetitively transmitted pulse having fixed rise characteristics and an R.F. carrier whose oscillations are coherent from pulse to pulse, the improvement of apparatus for identifying a segment of the pulse, comprising:
    means for sequentially sampling a segment of the pulse, the sequence of sampling being performed upon the received signal in an interval of fixed duration;
    means for determining the interval of fixed duration and for shifting the interval of fixed duration relative to the received signal;
    weighting devices for weighting each sample in accordance with its position in the sequence;
    an integrator for integrating the weighted samples; and
    an indicator responsive to the output of the integrator.

2. The improvement according to claim 1, wherein the means for determining the interval of fixed duration is a timing device for repetitively supplying a signal at a rate related to the repetition rate of the transmitted pulse.

3. The improvement according to claim 2, wherein the sequential sampling means include an array of gates to which the received signal is coupled, and the apparatus further includes means controlled by the timing device for providing a sequence of enabling signals to the gates.

References Cited

UNITED STATES PATENTS

| | | | |
|---|---|---|---|
| 2,811,718 | 10/1957 | Frank | 343—103 |
| 3,048,712 | 8/1962 | Alm | 328—110 X |
| 3,174,151 | 3/1965 | Abourezk | 343—103 |
| 3,325,810 | 6/1967 | Frank et al. | 343—103 |

RODNEY D. BENNETT, *Primary Examiner.*

H. C. WAMSLEY, *Assistant Examiner.*